Nov. 7, 1961  C. URLBERGER  3,007,354
HORIZONTAL BORING AND MILLING MACHINE
Filed Jan. 5, 1959  4 Sheets-Sheet 1

Carl Urlberger
INVENTOR.

BY

Nov. 7, 1961 C. URLBERGER 3,007,354
HORIZONTAL BORING AND MILLING MACHINE
Filed Jan. 5, 1959 4 Sheets-Sheet 2

Carl Urlberger
INVENTOR.

BY

Nov. 7, 1961    C. URLBERGER    3,007,354
HORIZONTAL BORING AND MILLING MACHINE
Filed Jan. 5, 1959    4 Sheets-Sheet 3

Carl Urlberger
INVENTOR.

BY

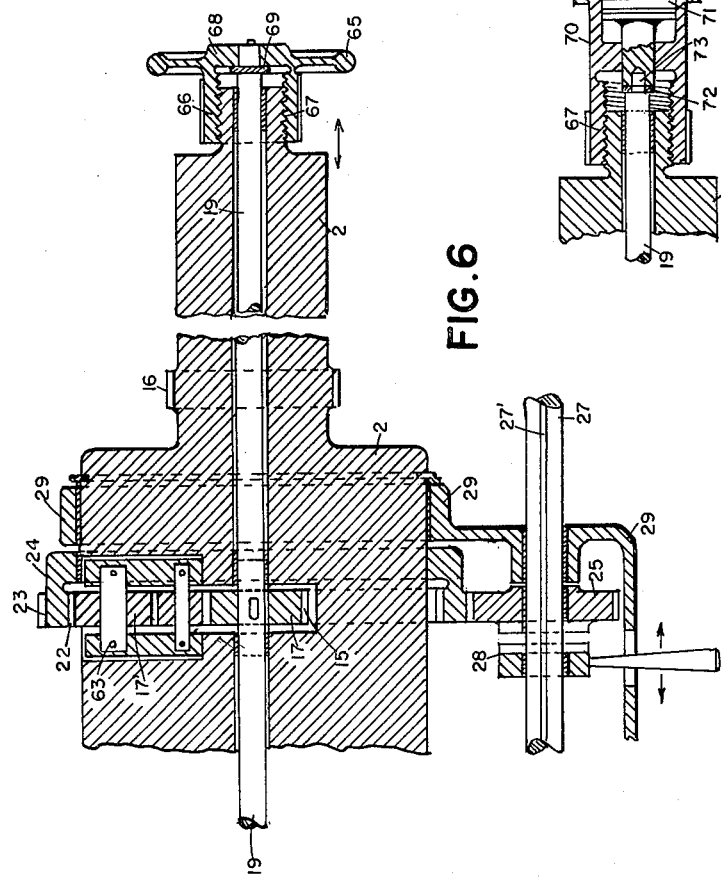

United States Patent Office 3,007,354
Patented Nov. 7, 1961

3,007,354
HORIZONTAL BORING AND MILLING
MACHINE
Carl Urlberger, Aschaffenburg (Main), Germany, assignor to Firma A. Neher, Maschinenfabrik Stahl- und Apparatebau G.m.b.H., Aschaffenburg (Main), Germany
Filed Jan. 5, 1959, Ser. No. 784,976
Claims priority, application Germany Jan. 8, 1958
8 Claims. (Cl. 77—3)

The invention relates to a horizontal boring and milling machine. Conventional machines of this type have a drill spindle for cylindrical drilling and a hollow spindle for surface milling. It is a known practice to connect to the drill spindle of such machines boring bars which are adjustable from their machine end or from the vicinity thereof, with the aid of a bar having a flat spiral which meshes with teeth in the tool holder, this setting bar being, moreover, capable of being urged against the tool holder thereby in order to ensure chatter-free operation, locking the latter tight.

This boring bar has had to be provided with a relatively bulky end facing the machine, i.e. in the region of connection to the drill spindle of the boring and milling machine, in order to accommodate the gears required for the setting and locking of the adjustment bar in a single housing. This arrangement, however, has the disadvantage that the drill rod's working length is thereby substantially reduced.

In order to avoid this disadvantage it is proposed, according to the invention, to extend the setting bar beyond the machine end of the boring bar toward the rear end of the drill spindle which is then provided with an opening in order for it to be connected at this point to the setting and locking gear which is housed in a gear chamber, advantageously formed in the drill spindle, and driven from the drill spindle via a toothed-wheel gearing.

The invention will now be further described with reference to the accompanying drawing which shows various embodiments of the subject of the invention, and in which:

FIG. 6 shows yet another embodiment of the drill spindle, in which the locking of the tool holder is effected by a handwheel fitted at the rear end of the drill spindle; and FIG. 7 is a still further embodiment of the spindle in which the locking is effected by shifting the setting bar by means of a pneumatic or hydraulic piston.

Figure 1:
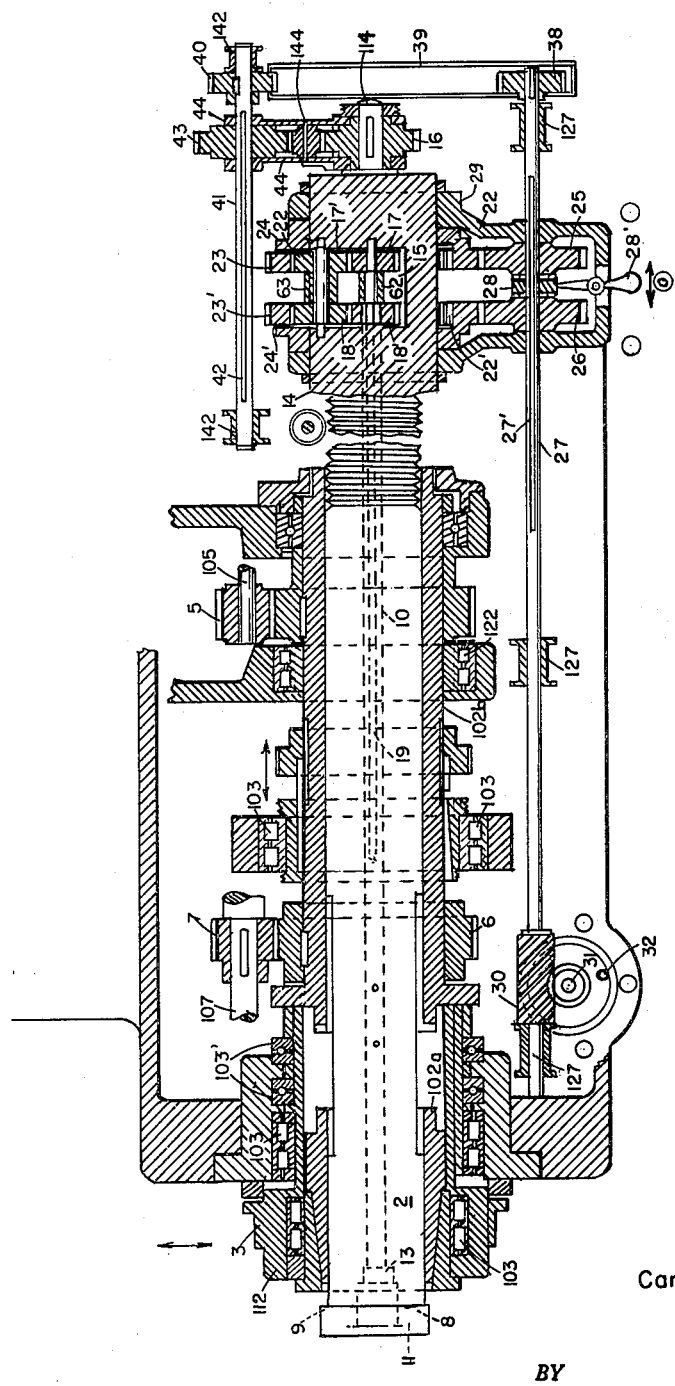
FIG. 1 is a vertical section through the spindle head and a longitudinal section through the drill spindle with the boring bar removed.

In FIG. 1 I show the vertically adjustable spindle head or headstock 1 of a horizontal milling and boring machine within which a hollow mill spindle 3 is journaled in the roller bearings 103. A pair of thrust bearings 103′ prevent axial displacement of the spindle 3 which is provided with a gear ring 6, rigidly secured thereto, in mesh with a drive gear 7 whose shaft 107 is driven by a motor not shown. A drill spindle 2 is co-axially mounted in the mill spindle 3 with freedom of angular and axial displacement relative hteretho. Spindle 2 is centered by the sleeves 102a, 102b, which are journaled in the headstock 1 by means of roller bearings 112 and 122, and extends beyond the mill spindle 3 toward the rear of the headstock 1. The drill spindle 2 is provided with a gear 4, rigidly secured to the spindle sleeve 102b, which meshes with a drive gear 5 whose shaft 105 may be coupled with the aforementioned motor or with some other drive means.

On its front end the drill spindle 2 is formed with a connecting flange 8 equipped with an external thread 9 and is provided with an axial bore 10 which, at its forward end has a centering countersink 11 and, further inwardly, a connecting bore 12 and a bearing hole 13. The rear end of the spindle 2 is provided with a gear housing 14 which may be formed integral with the spindle or threadedly secured thereto and which may be considered to constitute a part thereof. A stub shaft 114, projecting rearwardly from housing 14 and serving as an extension of the spindle 2, is keyed to a gear 16 or formed with teeth adapted to drive a gear 43 for the spindle 2 as described in greater detail hereinbelow. The housing 14 forms a chamber 15 through which a setting rod 19 passes. The setting rod 19 is adapted to adjust the boring-tool holder 53, which will be described further with reference to FIG. 2, and extends axially through the bore 10 in drill spindle 2 within which it is rotatably journaled and axially displaceable. The gear chamber 15, which opens in a direction transverse to the axis of the drill spindle 2, houses a pair of idler gears 17′, 18′ freely rotatable on a shaft 63 fixed in the walls of the chamber 15. Gears 17′ and 18′ rotate either directly (FIG. 1) or via the intermediary of a further pair of idler gear 17″, 18″ (FIG. 4) the gear 17 which rotates the setting rod 19 to position the tool holder and the gear 18; the latter locks the rod against the holder.

Figure 4:
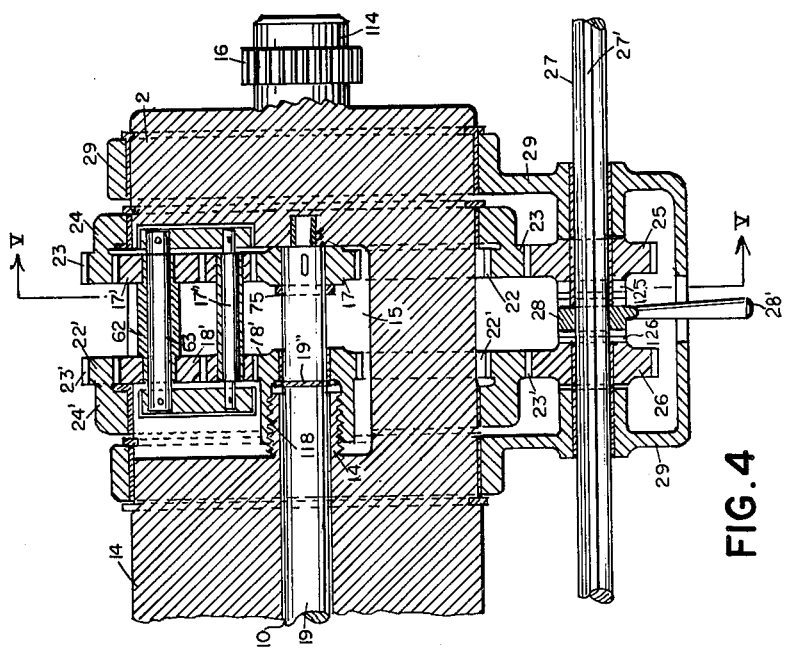
FIG. 4 is an enlarged partial cross-sectional view through the drill spindle in the vicinity of the end thereof.

As may be readily seen in FIG. 4, setting gear 17 is keyed to the setting rod 19 and prevented from shifting axially thereon by a spring clip 75 or by a spacer 62 (FIG. 1). The locking gear 18 is formed as a thimble journaled on the rod 19 whose internal thread 118 engages the externally threaded boss 74 which projects from a wall of the chamber 15 coaxially with the rod. Rotation of the locking gear 18 threads the latter onto the boss 74 and axially shifts the rod 19, whose shoulder 19″ bears against a complementary shoulder formed in the gear 18, to lock the tool holder 53.

The idler gears 17′, 18′ are driven by respective gear rings 24, 24′ which are rotatably mounted on the housing and have internal teeth 22, 22′ meshing with the idler gears 17′, 18′, and external teeth 23, 23′ which mesh, respectively, with a pair of gears 25, 26.

Figure 5:
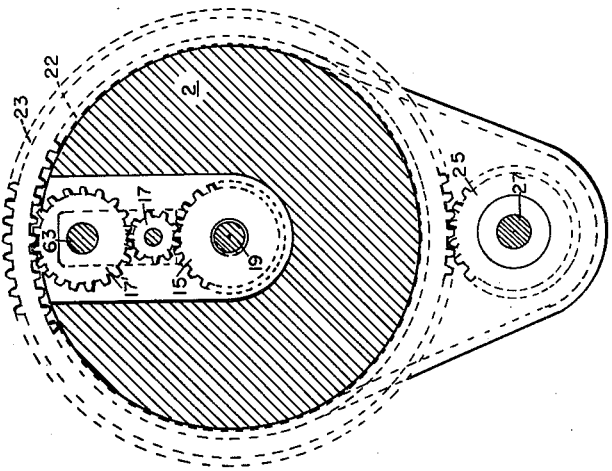
FIG. 5 is a cross-sectional view through the drill spindle taken along the line V—V of FIGURE 4.

The gears 25 and 26 are journaled on a control shaft 27 within an auxiliary gear housing 29 in whose walls the shaft 27 may rotate freely. The gear housing 29 is, in turn, rotatably secured to the housing 14 as best seen in FIGS. 4 and 5. Shaft 27 is provided with a longitudinal groove 27′ which engages a manually operable shift clutch 28 whose handle 28′ is adapted selectively to displace the clutch 28 in a direction parallel to the axis of spindle 2 into engagement with either the clutch face 125 of gear 25 or the clutch face 126 of gear 26. In an intermediate position of the clutch 28, neither of the latter gears is entrained by the shaft 27 and no adjustment of the setting bar ensues.

Shaft 27 is journaled to the headstock 1 at bearings 127 and carries a worm gear 30 which meshes with a worm 31 whose shaft also carries the handwheel 32. The latter, depending upon the position of the clutch 28, may either set the tool holder or lock the latter and is advantageously equipped with a vernier calibration, not shown, to indicate accurately the position of the tool holder.

When an automatic operation of the setting rod 19 is desired (e.g. for the production of tapered bores), the handwheel 32 may be uncoupled from its shaft in a manner known per se, whereupon the control rod 27 may be rotated in step with the spindle 2. For this purpose, I provide the shaft 27 with a gear 38 which is coupled, via a conventional variable-speed or stepless gear train shown schematically at 39, to the spur gear 40 keyed to an auxiliary shaft 42. The gear 43 (shown in FIG. 1) is splined to the latter shaft which is journaled in the bearings 142 to the headstock 1. An idler gear 144, in mesh with gear 16 and aligned with gear 43, is journaled between the blades of fork 44 swivelably mounted on the stub shaft 114 and is adapted to be swung in the plane of gear 43 into mesh therewith, thereby driving the latter from the drill spindle 2 and, via the gears 40, 38 and gear train 39, rotating the shaft 27 to displace the tool holder transversely to the axis of the spindle 2.

Figure 2:
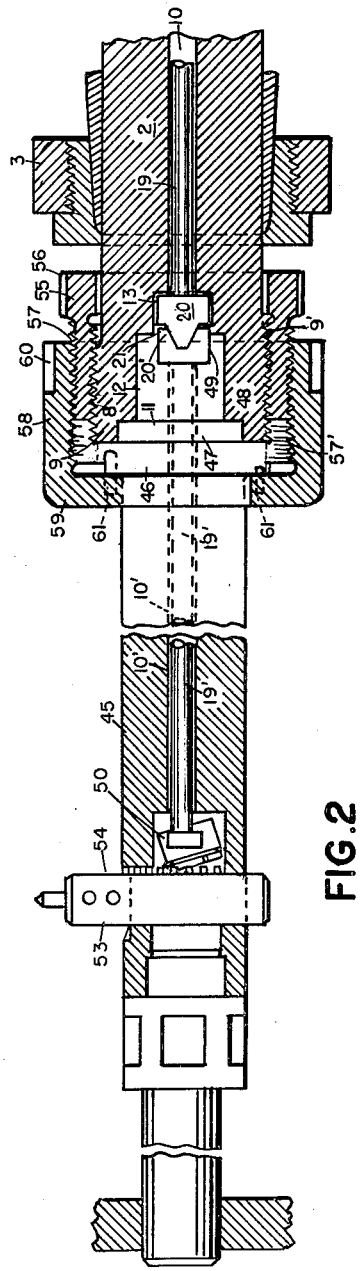
FIG. 2 is an axial section through the boring bar and a part of the drill spindle showing the boring bar connected to the drill spindle.

The boring bar 45 shown in FIG. 2 has, at its rear end, a coupling flange 46 having a shoulder 47 and a multislot clutch boss 48 provided with a bore 49. An axial bore 10' of the bar 45 receives the setting rod element 19' which is formed with a block 50 carrying a conventional tooth spiral which engages the rack 54 of the tool holder 53.

For securing the boring bar 45 on the drill spindle 2 I provide a differential lock comprising a threaded sleeve 55 whose female thread 9' is screwed onto the male thread 9 of the connecting flange 8 of drill spindle 2, and whose male thread 57, which is parallel to but smaller in pitch than the external threading 9, engages a cap nut 58.

The sleeve 55 is knurled or grooved at its exposed extremity 56 to facilitate the clamping of the boring bar 45 onto the drill spindle 2.

The cap nut 58, whose female-threaded cavity 57' receives the male-threaded sleeve 55, is likewise provided with a knurled or slotted circumferential surface 60 and engages the coupling flange 46 of the boring bar 45, via its collar 59, and, upon rotation relative to the sleeve 55, clamps the flanges 46 and 8 against each other to lock the boring bar 45 in place. To prevent loosening of the cap nut 58, one or more locking bolts 61 are threaded through the collar 59 thereof and lodged in the flange 46.

The setting rod 19 located in the drill spindle 2 has, on its forward end facing the boring bar, a coupling enlargement 20 rotatable within the bore 13. Enlargement 20 is formed with a tongue 21, which engages a complementary recess in the coupling member 20' of the boring bar's other setting-rod element 19'.

Figure 3:
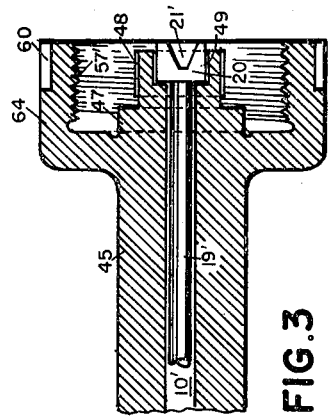
FIG. 3 is a partial axial section through another embodiment of the boring bar.

According to the embodiment represented in FIG. 3, the cap nut 58 may be constructed integrally with the boring bar 45, the boring bar 45 being then designed at its rear end in the shape of a bell 64 fitted with the female thread 57'.

In the embodiment of FIG. 6, instead of the setting and the locking of the tool holders from one position by means of the handwheel 32, these two operations may also be performed at different locations. The setting of the tool holder may thus be effected by means of the previously described handwheel 32 via the spiral gears 30, 31, whilst the locking of the tool holder is effected at the rear end of the drill spindle 2.

With this construction, the set of spur gears 18, 18' and the gear ring 24' of the gear chamber 15, together with their appurtenances, are not used and the setting rod member 19 is extended beyond the set of spur gears 17, 17'; and the drill spindle 2 is, preferably, also extended. The drill spindle 2 carries at its rear end a threaded boss 67 on to which a cap nut 66 carrying a handwheel 65 is threaded. The cap nut 66, upon being tightened, presses, with its inner surface 68, against the spring clip 69 secured to the setting bar member 19, thereby locking the rod 19' tight against the tool holder.

In another embodiment of the invention, illustrated in FIG. 7, the axial shifting of the setting bar member 19 to lock the tool holder may also be carried out pneumatically or hydraulically. Instead of the cap nut 66 being threaded onto the threaded union 67 as described above, there is a pneumatic or hydraulic cylinder 70, the piston 71 of which exerts its action on the pressure disc 72 of a lug 73 secured to the setting rod 19, is removably connected to boss 67. The cylinder 70 is thus equipped on its rear end with a cap 76 constructed as an injector 77 through which the pneumatic or hydraulic pressure medium is fed.

When constructing the system it is advantageous to take measures known per se to ensure a foolproof operation of the machine.

The way in which the invention works is as follows:

After the boring bar 45 with guide spar has been clamped onto the drill spindle 2 as previously described, the setting-rod element 19' is coupled, via members 20, 20', to the setting bar member 19 so that the tool holder 53 equipped with a boring tool can be moved radially (i.e. transversal to the axis of spindle 2) and clamped tight from the spindle head 1 of the drilling machine by means of gear 18 (FIGS. 1 and 4), handwheel 65 (FIG. 6) or pneumatic cylinder 70 (FIG. 7).

When it is desired to set the boring tool manually, the gear wheel 25 in the gear box 29 is coupled up to the control shaft 27 via the clutch 28, 28', so that, upon the rotation of handwheel 32, the control shaft 27 is driven via the worm gears 30, 31 and thus the gear 25 is rotated. The rotary movement of the handwheel 32 is transmitted from gear 25 to the setting gear 17 by way of the gears 23, 22, 17' to drive the setting rods 19, 19' and advance or retract the tool holder 53, depending upon the sense of rotation of handwheel 32.

When the drilling tool has been set, the gear wheel 25 is uncoupled from shaft 27 by shifting the clutch control lever 23' to its neutral position, and the gear wheel 26 is then coupled to the control shaft 27, 27'.

A rotation of the handwheel 32, now is transmitted via the worm gears 31, 30 and the control shaft 27 to the gear wheel 26 and thence via the gears 23', 22', 18' to the locking gear 18.

The latter threads further onto or off the threaded boss 74, depending on the sense of rotation of handwheel 32, thereby urging the setting bar 19, 19' with its tooth spiral 50 forwardly against the tool holder 53 to clamp the latter tight in the boring bar.

With rotation of the handwheel 32 in the opposite sense the locked tool holder 53 is released so that the boring tool can be set afresh in the manner described.

Automatic facing of ends of workpieces is effected by rotating the boring machine's drill spindle 2, while the gear 25 is coupled to the control shaft 27 by way of the clutch 28, 28', the variable-speed transmission or the stepless gear train 39 being then engaged at a predetermined transmission ratio.

Thus the rotary movement of the drill spindle 2 is transmitted, via gear 16, to the countershaft 42 and its gear 43 and from the latter, via gear 40, to the transmission 39, thence to the gear wheel 38 the control shaft 27 and the gear wheel 25 coupled thereto; the latter drives the gears 23, 22, 17', and the setting gear wheel 17 of the setting rods 19, 19'.

By virtue of the continuous rotary movement of the setting bar 19, 19', the facing-tool holder is displaced transversely to the axis of spindle 2—via the tooth spiral 50—in a continuous manner to face the end surfaces.

After the operation has been completed and the machine has been turned off, the transmission 39 is disengaged and the tool holder 53 is manually returned to its original position by using the handwheel 32.

The boring of tapered holes may be accomplished by imparting an axial displacement to the drill spindle via the conventional drilling mechanism while the tool holder is being displaced transversely as described for the facing process.

The ratio of the drill spindle's axial feed motion to the transverse feed motion of the drilling tool, which is capable of adjustment by the step-by-step gearing 39, determines the taper. Tapered boring thus also takes place in a completely uninterrupted manner without the formation of riffles or the chattering of the drilling tool as is the case with conventional feed-limiting devices and control levers or wheels.

What I claim is:

1. In a boring machine, in combination, a housing, a spindle rotatably journaled in said housing and having an extremity projecting therefrom, a boring bar removably secured to said extremity in axial alignment with said spindle, a tool holder received in said boring bar and displaceable transversely thereto, said spindle being provided with a first longitudinal bore and said bar being provided with a second longitudinal bore registering with said first bore and terminating at said tool holder, an axially shiftable setting rod rotatably received in said bores and extending into said spindle, said rod having an end terminating at said tool holder, complementary means on said end and on said tool holder for displacing the latter upon rotation of said rod, setting means at a location on said spindle remote from said extremity for adjustably rotating said rod, thereby positioning said tool holder, locking means on said spindle for axially shifting said rod against said tool holder into a position immobilizing the latter, and drive means for rotating said spindle, said setting rod comprising a first rod element in said first bore and a second rod element in said second bore, said elements being provided with mating coupling means at said extremity of said spindle.

2. The combination according to claim 1 wherein said spindle is formed with a gear chamber at said location, said setting rod extending into said chamber, said setting means comprising first gear means in said chamber including a driven gear keyed to said rod for rotating same, and control means on said housing selectively couplable to said first gear means for operating the latter.

3. The combination according to claim 2 wherein said control means includes a variable speed-change transmission operatively coupled to said spindle for rotating said rod with an angular velocity proportional to that of said spindle.

4. The combination according to claim 2 wherein said locking means comprises a thimble entraining said rod and threadedly engaging said spindle, and second gear means for rotating said thimble, thereby displacing said rod axially within said spindle, said control means being selectively couplable to said second gear means for operating the latter.

5. The combination according to claim 4 wherein said control means comprises a manually rotatable shaft in said housing and selector means for selectively coupling said shaft to said first and second gear means.

6. The combination according to claim 1 wherein said locking means comprises a thimble threadedly engaging said spindle at the other extremity thereof and entraining said rod, and means for manually rotating said thimble, thereby displacing said rod axially within said spindle.

7. The combination according to claim 1 wherein said locking means comprises a fluid-pressure-operated piston connected to said rod, and means for actuating said piston, thereby displacing said rod axially within said spindle.

8. The combination according to claim 1 wherein said bar and said extremity of said spindle are provided with mating coupling means including a differential-screw assembly for removably connecting them to each other.

References Cited in the file of this patent
UNITED STATES PATENTS

| | | |
|---|---|---|
| 513,827 | Richards | Jan. 30, 1894 |
| 2,053,644 | Tuttle | Sept. 8, 1936 |
| 2,277,290 | Bennett | Mar. 24, 1942 |
| 2,345,060 | Morton | Mar. 28, 1944 |
| 2,739,495 | Johnson | Mar. 27, 1956 |
| 2,826,102 | Merget | Mar. 10, 1958 |